UNITED STATES PATENT OFFICE.

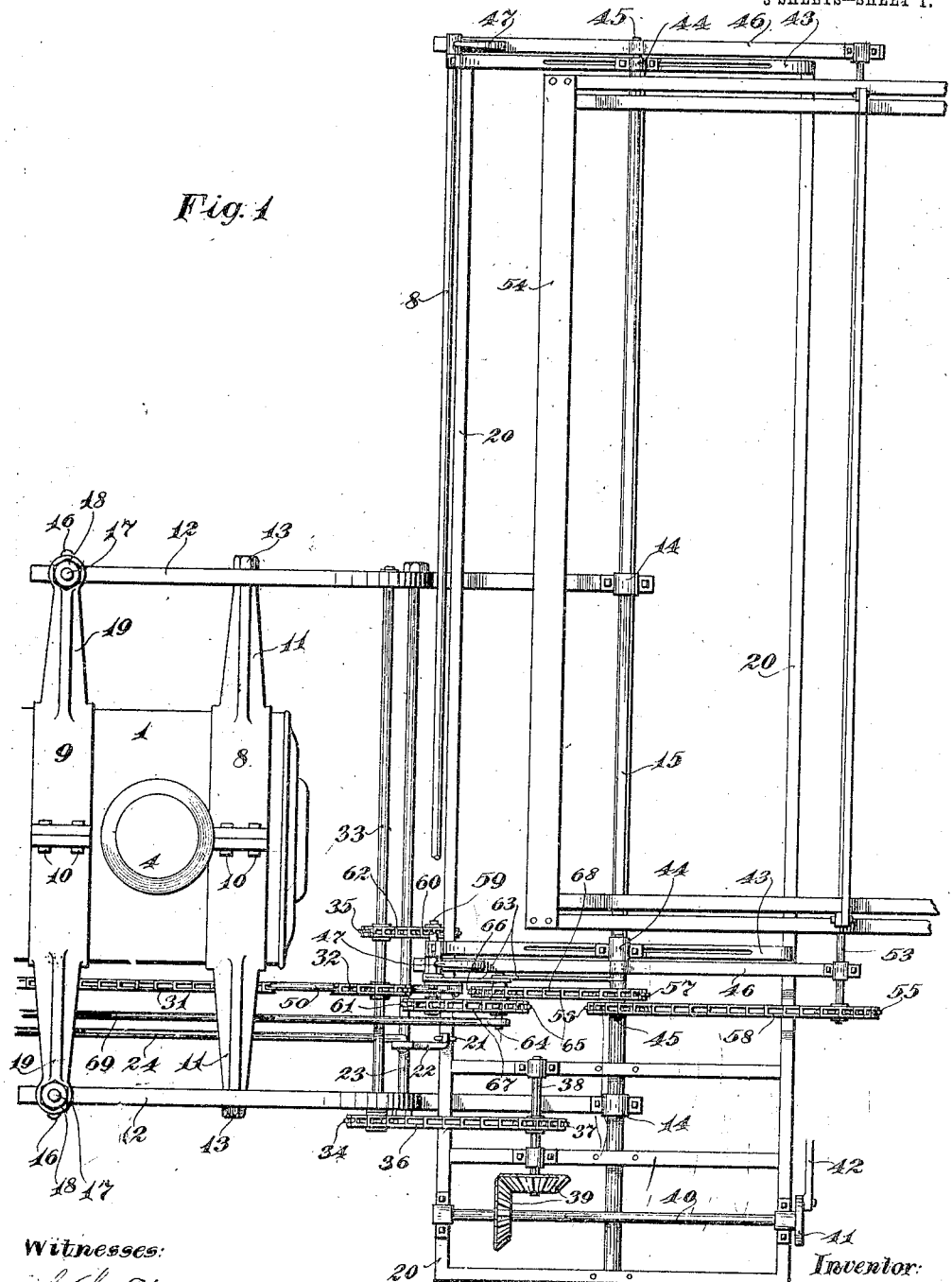

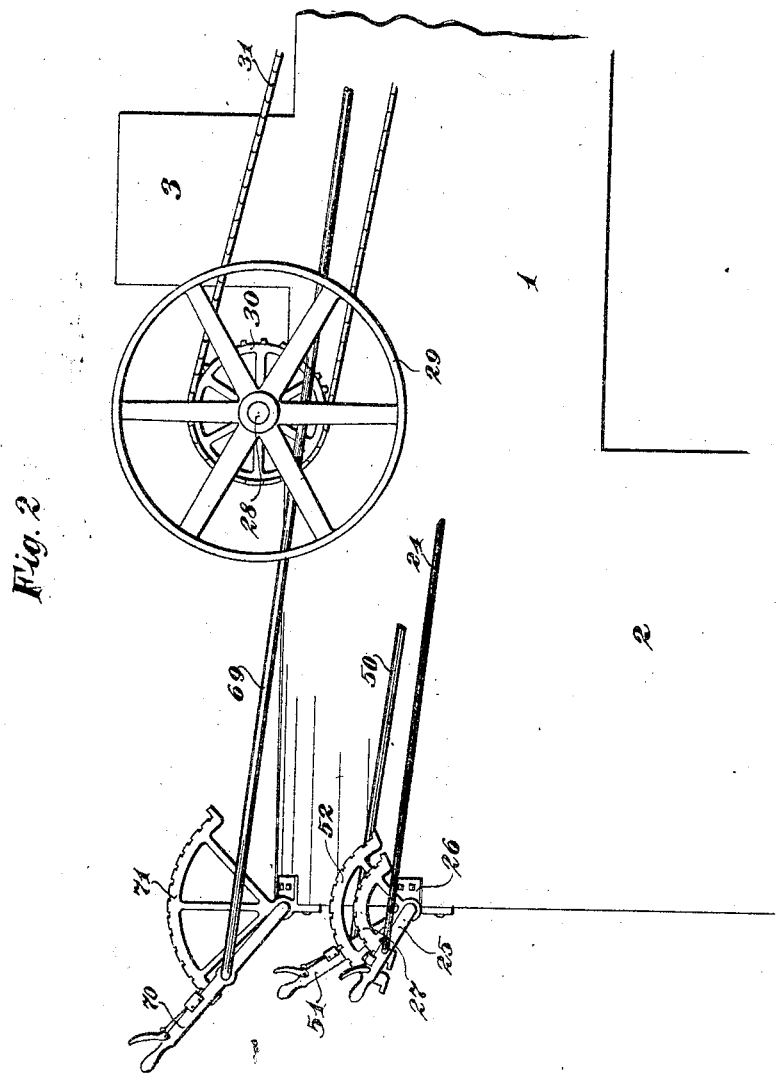

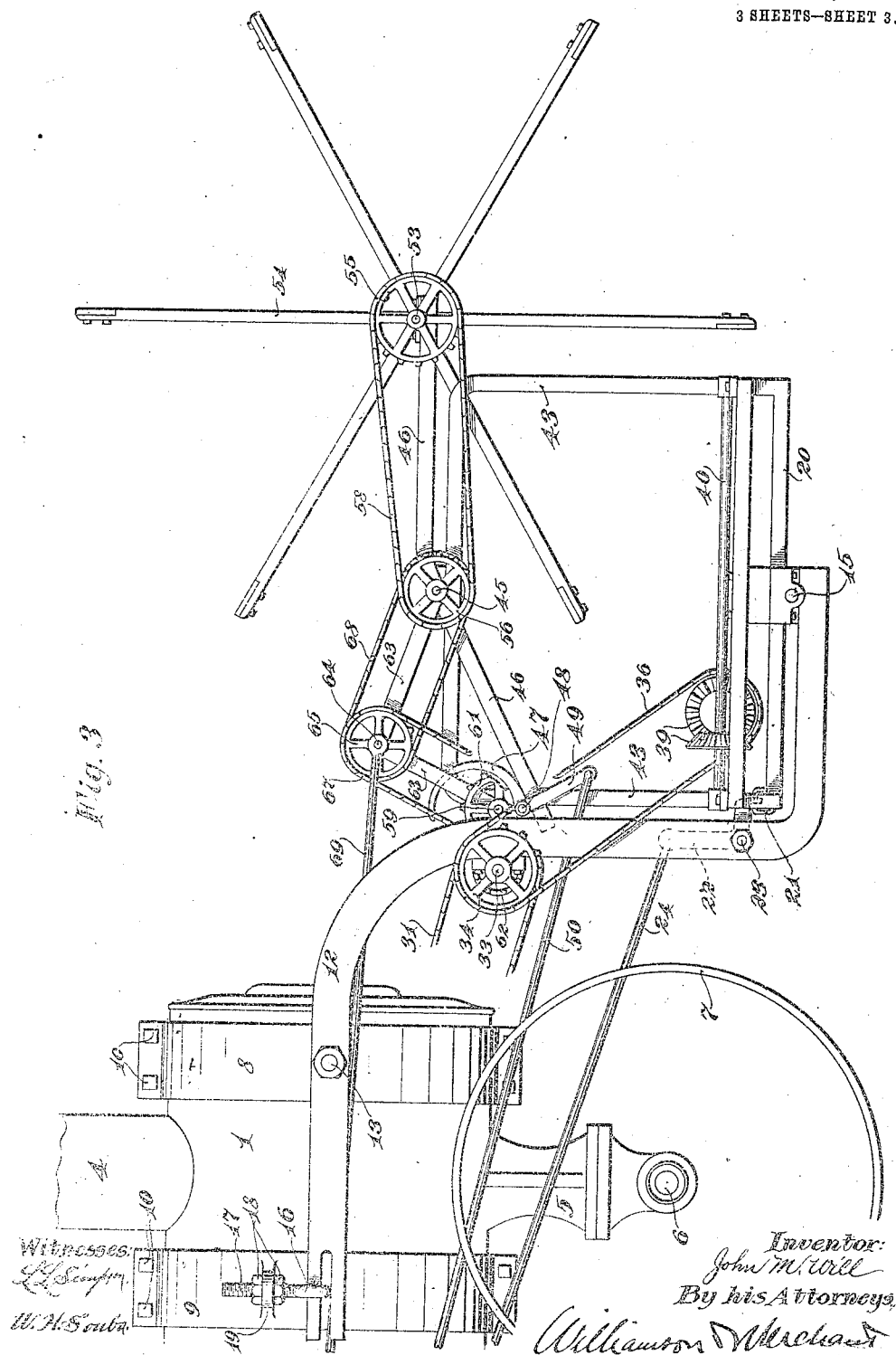

JOHN M. WILL, OF OAKES, NORTH DAKOTA.

HARVESTER ATTACHMENT FOR TRACTION-ENGINES.

No. 914,097.　　　　Specification of Letters Patent.　　　Patented March 2, 1909.

Application filed April 2, 1908. Serial No. 424,976.

*To all whom it may concern:*

Be it known that I, JOHN M. WILL, a citizen of the United States, residing at Oakes, in the county of Dickey and State of North Dakota, have invented certain new and useful Improvements in Harvester Attachments for Traction-Engines; and I do hereby declare the following to be a full, clear, and exact description of the invention, such as will enable others skilled in the art to which it appertains to make and use the same.

My invention relates to engine driven harvesting machines and is particularly directed to an improved arrangement whereby a harvester in the nature of an attachment is adapted to be applied to and carried in front of the traction engine.

To the above ends the invention consists of the novel devices and combinations of devices hereinafter described and defined in the claims.

In the accompanying drawings which illustrate the invention, like characters indicate like parts throughout the several views.

Referring to the drawings, Figure 1 is a plan view, showing the harvester or harvesting attachment applied to a traction engine and carried in front thereof; and Figs. 2 and 3 are supplemental views in side elevation, showing the traction engine and harvesting attachment applied thereto.

The traction engine, which may be of the usual or any suitable construction, is diagrammatically illustrated, and of the parts thereof it is only desirable to note the boiler 1 having a fire box 2, dome 3, smoke stack 4, and pedestal bearing 5, by means of which latter the front end of the boiler is pivotally supported on the axle 6 of the front wheels 7, the rear wheels of the engine not being shown in the drawings.

To arrange for the application of the improved harvesting attachment, a pair of heavy divided clamping bands 8 and 9 are clamped around and secured to the front end of the boiler, the former in front and the latter at the rear of the smoke stack 4 and pedestal 5. The flanged ends of the band sections are shown as rigidly connected by nutted bolts 10, located at the tops and bottoms of the bands. The band 8 is provided with a horizontal outwardly extended fulcrum arm 11, on the extreme outer ends of which heavy platform supporting levers 12 are intermediately pivoted at 13. These platform supporting levers 12, forward of their pivots 13, are extended vertically downward and are then extended horizontally forward and are provided at their extreme forward ends with bearings 14, in which is journaled a long transversely extended platform supporting torsion rod 15. At their extreme rear ends the levers 12 are shown as bifurcated and as extended through depending eyes 16 of heavy eye-bolts 17, which eye-bolts are passed through and rigidly but adjustably secured by nuts 18 to the outer ends of anchoring arms 19, which latter are shown as formed integral with and extended horizontally outward from the sections of the clamping band 9. As is evident, by vertical adjustments of the eye-bolts 17 the forward ends of the levers 12 and, hence, the torsion rod 14, may be vertically adjusted.

The platform frame 20 of the harvester may be of substantially the usual rectangular form, and it is extended parallel to and just above the torsion rod 15; and, by a multiplicity of suitable bearings or brackets, is rigidly secured to the said torsion rod. This torsion rod, so-called, stiffens the long rectangular platform frame against twisting or torsional movements, and, at the same time, it affords a rock shaft or pivotal support upon which the said binder platform may be oscillated, so as to raise and lower the front edge of the said platform and consequently to vary the height of the cut made by the sickle, not shown but which, as will be understood, will be applied in the usual way to the front edge of the said platform frame.

The rear edge portion of the platform frame 20, at the right hand side of the engine boiler, is connected, as shown, by means of a link 21, to one end of a bell crank 22, which bell crank, as shown, is pivoted on a tie bolt 23 that connects the lower portions of the vertically extended sections of the levers 12. The upper arm of the bell crank 22 is connected by a long rod 24 to a latch lever 25 which, as shown, is journaled to a bearing 26 on the rear end of the boiler 1 and is arranged to be locked to a notched lock segment 27 rigidly secured to the said bearing 26.

The usual steam engine will preferably be mounted on top of the boiler in the customary way. This steam engine is not shown in the drawings but its crank shaft is indicated by the numeral 28; and this shaft carries a fly-wheel or pulley 29 and a sprocket 30. A long sprocket chain 31 runs over the sprocket 30 and over a sprocket 32 of a shaft 33, which shaft is journaled in suitable bearings on the vertical portions of the levers 12. At its right hand end the shaft 33 carries a sprocket 34 and at the left of the sprocket 32 it is provided with a sprocket 35. A sprocket chain 36 runs over the sprocket 34 and over a sprocket 37 carried by a short counter-shaft 38 journaled in suitable bearings on the platform frame 20. The counter-shaft 38 is connected, by miter gears 39, to a sickle driving shaft 40 mounted in suitable bearings on the platform frame 20. At its forwardly projecting end the shaft 40 is provided with a crank disk 41 to the crank pin of which a sickle driving pitman 42 is connected in the customary way. The binder (not shown) may also be driven from the shaft 40 by the usual or any suitable means.

Inverted U-shaped frames 43 are secured to the front and rear portions of the platform frame 20. One of these frames 43 is located at the left hand end of the binder platform and the other is located a distance considerably inward from the right hand end thereof. The horizontal upper portions of these frames 43 are slotted to form guides for slidable bearings 44. These bearings 44 are provided with outwardly projecting trunnions 45 upon which are intermediately pivoted reel supporting levers 46. The rearwardly extended ends of these levers 46 are actuated by cams in the form of curved arms 47 that are rigidly secured to the opposite ends of a long rock shaft 48 mounted in suitable bearings on the rear vertical portions of the two frames 43. At its right hand end the rock shaft 48 is provided with a depending arm 49 that is connected, by a long rod 50, to a latch lever 51 that coöperates with the notched latch segment 52 rigidly secured to the rear end portion of the boiler.

Mounted in suitable bearings on the forwardly projecting ends of the levers 46 is a reel shaft 53 that carries a reel 54. At its right hand end the shaft 43 is provided with a sprocket 55. On the right hand trunnion 45 is loosely journaled a pair of rigidly connected sprockets 56 and 57. A sprocket chain 58 runs over the sprockets 55 and 56. A short shaft 59 is journaled in suitable bearings on the rear portion of the right hand of inner frame 43; and, at one end, is provided with a sprocket 60, and at its other end with a sprocket 61. A sprocket chain 62 runs over the sprocket 60 and over the sprocket 35 of the shaft 33.

Adjacent to the right hand reel supporting lever 46 is a toggle 63, the forwardly extended link of which is pivotally connected to the right hand trunnion 45, and the rearwardly extended link of which is pivoted on the short shaft 59 just above noted. Located at the intermediate joint of the toggle 63 and rigidly secured to one of the links thereof is a trunnion 64, on which is loosely journaled a pair of rigidly connected sprockets 65 and 66. A sprocket chain 67 runs over the sprockets 61 and 65 and a sprocket chain 68 runs over the sprockets 66 and 57. Means has now been described whereby motion will be transmitted from the engine crank shaft 28 to the sickle and the reel of the harvester.

The forwardly extended end of a long rod 69 is pivotally connected to the end of the stud 64. At its rear end this rod 69 is pivotally connected to a latch lever 70 that coöperates with a notched latch segment 71 rigidly secured to the rear end of the boiler 1.

As already indicated, the harvester attachment may be vertically adjusted as an entirety by vertical adjustments of the eye-bolts 17, by means of which the supporting levers 12 may be set in different adjustments.

By manipulation of the lever 25 the harvester platform may be oscillated on the torsion rod 15 so as to raise and lower the sickle, not shown, but which, as already stated, may be applied in the usual way to the front edge of the binder platform. By movements of the lever 51 the cam arms 47 may be moved and caused to act upon the rear ends of the reel supporting levers 46 so as to raise or lower the reel, as may be desired. By movements of the lever 70 the toggle 63 may be straightened out or folded to any desired angle, so as to move the reel in a forwardly or rearwardly direction, as may be desired to position the same for the most efficient delivery of the standing grain to the sickle. In practice it may be found desirable to apply a toggle such as above described at each end of the reel instead of one end only, as shown in the drawings. This duplex arrangement would insure the positive sliding movements of both of the bearings 44 on the solid horizontal portions of the frames 43. The reel drive shown, as is evident, remains operative throughout all of the adjustments of the reel and in no way interferes with the reel adjustments.

The harvester platform should, of course, be so supported from the traction engine that the bound bundles discharged from the harvester will be delivered entirely at one side of the traction engine where they will not be run over by the wheels thereof. A harvester attached to a traction engine and driven therefrom in the general manner above described, may have a very long platform and cutting mechanism adapted to cut a very wide swath.

When it is desirable to use the traction engine for other purposes than that of carrying the harvester, the harvesting attachment may be very quickly and easily detached from the engine and, when desired, may be again very quickly and easily applied to the engine.

What I claim is:

1. The combination with a traction engine, of laterally spaced platform supports secured to and projecting forward of the boiler of said engine, a harvester carried by said platform supports in front of said traction engine and comprising an approximately horizontal platform and a reel adjustably mounted thereon, substantially as described.

2. The combination with a traction engine and laterally spaced platform supports secured to and projecting forward of the boiler thereof, of a harvester comprising an approximately horizontal platform pivotally mounted on the forward end portions of said platform supports, means for setting and securing said platform in different angular adjustments, and a reel adjustably mounted on said platform, substantially as described.

3. The combination with a traction engine and laterally spaced platform supports secured to and projecting forward of the boiler thereof, of a harvester comprising a platform pivotally mounted on the forward end portions of said platform supports, and means for setting said platform in different angular adjustments, comprising a coöperating latch lever and segment on the rear end portion of the engine boiler, and a connection between said latch lever and the said platform, including a bell crank, substantially as described.

4. The combination with a traction engine, of a pair of clamping bands detachably secured to the forward end portion of the boiler, a pair of laterally spaced platform supporting levers intermediately pivoted to one of the said clamping bands and adjustably connected to the other, and a harvester having its platform mounted on the forwardly extended end portions of said levers, substantially as described.

5. The combination with a traction engine, of a pair of clamping bands detachably applied to the forward end portion of the boiler thereof, the said clamping bands having outwardly extended arms, a pair of downwardly and forwardly extended platform supporting levers intermediately pivoted on the arms of the forward clamping band, vertically adjustable bolts connecting the rear ends of said levers to the arms of the rear clamping band, and a harvester having its platform adjustably supported by the forwardly projecting ends of said levers, substantially as described.

6. The combination with a traction engine and forwardly projecting platform supports applied to the boiler thereof, of a harvester comprising a platform pivotally supported by the forwardly extended ends of said platform supports, means for securing said platform in different angular adjustments, reel supporting frames applied to said platform, bearings mounted to slide on said reel supporting frames, reel supporting levers intermediately pivoted to said sliding bearings, a reel carried by the forwardly projected ends of said reel supporting levers, cam devices simultaneously operative on the rearwardly extended ends of said reel supporting levers, and a cam operating connection extending to the rear of the traction engine, whereby the reel may be vertically adjusted, substantially as described.

7. The combination with a traction engine, of laterally spaced platform supports secured to and projecting forward from the boiler of said engine, and a harvester comprising a platform carried by the forwardly extended ends of said platform supports, laterally spaced reel supporting frames applied to said platform, reel supporting bearings mounted to slide on said reel supporting frames, reel supporting levers intermediately pivoted on said sliding bearings, a reel carried by the forwardly projected ends of said reel supporting levers, cams simultaneously operative on the rearwardly extended ends of said reel supporting levers, a cam actuating connection extending to the rear end of the boiler for imparting vertical adjustments to said reel, a toggle connecting said sliding bearings to one of the reel supporting frames, a toggle adjusting connection extending to the rear of the traction engine, whereby the reel may be adjusted horizontally, and a reel drive involving sprockets and chains, certain of which sprockets are carried by said toggle, substantially as described.

In testimony whereof I affix my signature in presence of two witnesses.

JOHN M. WILL.

Witnesses:
ROBERT WESSEL,
F. J. GRAHAM.